United States Patent Office 3,492,245
Patented Jan. 27, 1970

3,492,245
CATALYST COMPOSITION COMPRISING AN ORGANOALUMINUM COMPOUND, A TUNGSTEN HEXAHALIDE AND A COMPOUND OF THE FORMULA ROH
Nissim Calderon and William Allen Judy, Akron, Ohio, assignors to The Goodyear Tire & Rubber Company, Akron, Ohio, a corporation of Ohio
No Drawing. Filed Apr. 14, 1966, Ser. No. 542,470
Int. Cl. B01j 11/00, 11/84; C08f 1/28
U.S. Cl. 252—429                                 8 Claims

ABSTRACT OF THE DISCLOSURE

A composition useful as a catalyst which comprises (A) at least one organoaluminum compound, (B) at least one tungsten halide and (C) at least one oxygen-containing compound such as water, an alcohol, a phenol or a di-alcohol and the like, is reacted together in a molar relationship of (A), (B) and (C), B/C of from about 0.3/1 to about 20/1 and the molar ratio of A/B is about 0.5/1 to about 15/1 is disclosed.

---

This invention is directed to novel compositions of matter. More particularly it is directed to new compositions which are useful as catalysts.

The new composition of this invention is a mixture comprising (A) at least one organo-metallic compound wherein the metal is selected from the group consisting of Ia, IIa, IIb, and IIIa of the Periodic Table of Elements, (B) at least one metal salt wherein the metal is selected from the group of molybdenum and tungsten and (C) at least one compound of the general formula R—Y—H wherein Y is selected from the group of oxygen and sulfur and wherein R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl, and thioalkaryl; (8) when Y is O, R is alkoxy, arylalkoxy, and alkaryloxy, and (9) radicals of (2) through (6) wherein at least one hydrogen is substituted by at least one material selected from thiol (SH) and hydroxyl (OH) groups. The Periodic Table of Elements referred to can be found in the Handbook of Chemistry and Physics, 44th edition, April 1962 reprint, published by the Chemical Rubber Publication Company, Cleveland, Ohio, U.S.A., page 448.

Representative examples of metals from which the organo-metallic compound, the first or (A) component of the catalyst system of this invention, can be derived are lithium, sodium, potassium, rubidium, cesium, beryllium, magnesium, calcium, strontium, barium, zinc, cadmium, aluminum, gallium, indium, and thallium. The preferred organo-metallic compounds are compounds of lithium, sodium, magnesium, aluminum, zinc, and cadmium, with aluminum being most preferred.

Representative examples of organo-metallic compounds useful as the first or (A) catalyst component of this invention are aluminum compounds having at least one aluminum-to-carbon bond such as trialkylaluminums such as trimethylaluminum, triethylaluminum, tri-n-propylaluminum, tri-n-butylaluminum, triisopropylaluminum, triisobutylaluminum, trihexylaluminum, trioctylaluminum and the like; triaryl aluminums such as tritolylaluminum, tribenzyl aluminum, triphenylaluminum and the like; dialkylaluminum halides such as diethylaluminum chloride, di-n-propylaluminum chloride, diisobutylaluminum chloride, diethylaluminum bromide, diethylaluminum iodide and the like; mixtures of dialkylaluminum halides and alkylaluminum dihalides such as ethylaluminum sesquichloride and bromides may also be employed; alkylaluminum dihalides such as ethylaluminum dichloride, ethylaluminum dibromide, propylaluminum dichloride, isobutylaluminum dichloride, ethylaluminum diiodide and the like; dialkylaluminum hydrides such as diethylaluminum hydride, di-n-propylaluminum hydride, diisobutylaluminum hydride and the like; arylaluminum hydrides and dihydrides such as diphenylaluminum hydride and phenylaluminum dihydride; the arylaluminum halides such as phenylaluminum dibromide, tolylaluminum dibromide, benzylaluminum dibromide, phenylaluminum diiodide, tolylaluminum diiodide, benzylaluminum diiodide, diphenylaluminum chloride, ditolylaluminum chloride, dibenzylaluminum bromide and the like. Other organo-metallic compounds are also useful in the practice of this invention. Representative of such organo-metallic compounds are alkali metal organo compounds such as alkyl lithium compounds examples of which are ethyllithium, n-butyllithium, t-butyllithium and the like; lithium-aluminum-tetraalkyls such as lithium-aluminum-tetrabutyl, lithium-aluminum-tetraethyl and the like; alkali metal alkyls and aryls such as amylsodium, butylpotassium, phenylpotassium, phenylsodium, phenyllithium, butyllithium and the like; magnesium alkyls and aryls such as diphenylmagnesium, diethylmagnesium, ethylmagnesium chloride, phenylmagnesium chloride, butylmagnesium bromide and the like; calcium strontium, and barium organo compounds such as barium alkyls and aryls; alkyls and aryls of Group IIb metals such as diethylzinc, diphenylzinc, ethylzinc chloride, diethylcadmium, dibutylcadmium and the like; Grignard agents such as phenylmagnesium bromide and chloride may also be employed. Mixtures of these compounds may be employed as the first or (A) catalyst component in the catalyst of this invention. It is usually preferred to employ aluminum compounds, trialkyl aluminums, dialkylaluminum halides, alkylaluminum dihalides and aluminumsesquihalides.

The metal salts employed in the catalyst of this invention, as the second or (B) catalyst component, are salts of metals of molybdenum and tungsten and include molybdenum salts and tungsten salts. Representative of such salts include halides such as chlorides, bromides, iodides, and fluorides, which include compounds such as molybdenum pentachloride, molybdenum hexachloride, tungsten hexachloride, molybdenum pentabromide, molybdenum hexabromide, tungsten hexabromide, molybdenum pentaiodide, molybdenum hexaiodide, tungsten hexaiodide, molybdenum pentafluoride, molybdenum hexafluoride, and tungsten hexafluoride. Other representative salts are those of acetylacetonates, sulphates, phosphates, nitrates and the like which include compounds such as molybdenum phosphate, tungsten phosphate, molybdenum nitrate, tungsten nitrate, molybdenum acetylacetonate, tungsten acetylacetonate, molybdenum sulphate, and tungsten sulphate. Mixtures of these salts may also be employed. Of these, it is usually preferred to employ tungsten halides and molybdenum halides representative of which are tungsten hexachloride and molybdenum pentachloride.

The third or (C) component of the catalyst system of this invention are compounds which respond to the formula R—Y—H wherein Y is selected from the group consisting of oxygen and sulfur and R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl, and thioalkaryl, (8) when Y is O, R is alkoxy, arylalkoxy, and alkaryloxy, and (9) radicals of (2) through (6) wherein at least one hydrogen of R is substituted by at least one thiol (SH) or hydroxyl (OH) group.

Thus, the formula above defines a number of types of compounds. It defines water (HOH), hydrogen sulfide (HSH), both saturated and unsaturated alcohols (ROH), saturated and unsaturated mercaptans (RSH), hydroperoxides (ROOH), hydrodisulfides (RSSH), polyalcohols (HOROH), polymercaptans (HSRSH), and hydroxy mercaptans (HSROH) or thioalcohols (HORSH). Representative examples of the materials responding to the formula above are alcohols such as methanol, ethanol, isopropanol, tertiarybutyl alcohols, amyl alcohol, benzyl alcohol, allyl alcohol, 1,1-dimethyl benzyl alcohol, phenol, tertiarybutyl catechol, alpha and beta naphthyl alcohol; mercaptans such as methyl, ethyl, propyl, isopropyl, butyl, amyl, and the like mercaptans, allyl mercaptan, thiophenol, 4-methylthiophenol, 4-mercaptophenol; the hydroperoxides such as cumyl hydroperoxide, tertiary butyl peroxide; the hydrodisulfides such as cumyl hydrodisulfide, t-butyl hydrodisulfide; the polyalcohols such as 1,3-propane diol, ethylene glycol, glycerol and similar polyglycerols and polyglycol; catechol, resorcinol, hydroquinone, pyrogallol; the polymercaptans such as 1,3-propane dithiol, 1,4-dithio benzene; the hydroxymercaptans or thioalcohols such as ethane-2-ol-1-thiol, 1-hydroxy-4-thio benzene.

One of the unusual and distinguishing features of this invention is that the compounds of the formula R—Y—H, wherein R and Y have been previously defined, depending on the particular organo-metallic compound and the particular metal salt chosen and on the particular R—Y—H compound chosen, when employed in fairly substantial amounts are known to reduce the activity of the catalysts of this invention. (For instance, such materials as alcohols have been utilized as shortstoppers in the catalyses of a polymerization reaction of conjugated diolefins with catalysts prepared by organo-metallic compounds and metal salts of Group IVb metals.) Since the instant invention contemplates the use of organo-metallic compounds in combination with transition metal salts and various oxygen- and sulfur-containing compounds, and since various factors or considerations will influence the optimum range of the three catalyst components in relation to each other, the optimum molar ratios of the three components cannot be readily set forth. However, by following the various teachings found elsewhere and particularly in the examples of this application, those skilled in the art can readily determine the optimum molar ratio of the three catalyst component to each other. Obviously, if one employs the oxygen- or sulfur-containing compound, or as is designated above, component C in relatively large amounts, the activity of the catalyst will be reduced considerably or even destroyed.

It has been found that good results are obtained when the molar relationship between the three catalyst components, A, B, and C, are within a molar ratio of B/C ranging from about 0.3/1 to at least about 20/1 and the molar ratio of A/B is within the range of about 0.5/1 to at least 15/1. More preferred ratios are B/C of 0.5/1 to 5/1 and A/B of 0.5/1 to 8/1. Still more preferred ratios are B/C of 1/1 to 2/1 and A/B of 0.75/1 to 5/1.

The catalysts employed in this invention are prepared by mixing the components by known techniques. Thus, the catalysts may be prepared by "preformed" or "in situ" techniques. By the "preform" method the catalyst components are mixed together prior to exposure of any of the catalyst components to the materials to be catalyzed. In the "in situ" method the catalyst components are added separately to the materials to be catalyzed. The catalyst components may be mixed either as pure compounds or as suspensions or solutions in liquids which do not adversely affect their activity as catalysts.

While the presence of the materials to be catalyzed is not essential during the formation of active catalyst by a mixing of components A, B, and C of the composition of this invention and this fact facilitates the use of "preformed" catalysts or compositions, it has been found that freshly preformed catalysts or compositions are much more active than catalysts which have been allowed to age before use.

The order of addition of the three catalyst components to each other is of interest in the preparation of the compositions of this invention. There are various methods in which the three catalyst components can be brought into contact with the materials to be catalyzed. The following is a numerical listing of these various methods in which A, B, and C stand for the catalyst components as previously defined.

(1) Simultaneous addition of A, B, and C.
(2) C followed by A plus B which were previously preformed.
(3) A and B preformed followed by C.
(4) A followed by B and C which were preformed.
(5) B and C preformed followed by A.
(6) B followed by A and C which were preformed.
(7) A and C preformed followed by B.
(8) A followed by B followed by C.
(9) B followed by A followed by C.
(10) C followed by B followed by A.
(11) C followed by A followed by B.
(12) B followed by C followed by A.
(13) A followed by C followed by B.
(14) Preformed A, B, and C which was prepared by adding A to B and C preformed.
(15) Preformed A, B, and C which was prepared by adding B to A and C preformed.
(16) Preformed A, B, and C which was prepared by adding C to A and B preformed.

Of these various procedures, Procedures 6, 7, 11, 13 and 15 listed above are methods of preparation which reduce somewhat the catalyst activity. The remaining of the listed Procedures 1, 2, 3, 4, 5, 8, 9, 10, 12, 14, and 16 lead to the most active catalyst system.

As is stated before, the compositions which constitute this invention are useful as catalysts. The compositions of this invention can be employed to cause open-ring polymerization of certain unsaturated alicyclic compounds. A further description of the polymerization of these unsaturated alicyclic compounds by the compositions of this invention can be found in our co-pending application filed Mar. 28, 1966, Ser. No. 537,661, titled, "Polymerization Process." One group of these unsaturated alicyclic compounds contain at least 4 and not more than 5 carbon atoms in the cyclic ring and contain one carbon-to-carbon double bond in the cyclic ring. Another group of unsaturated alicyclic compounds which can be open-ring polymerized by the compositions of this invention contain at least 8 carbon atoms in the cyclic ring and contain at least one and usually no more than three carbon-to-carbon double bonds in the cyclic ring. Representative of the unsaturated alicyclic compounds are cyclobutene and cyclopentene which contain one double bond and 4 or 5 carbon atoms. Representative of unsaturated alicyclic compounds having at least 8 carbon atoms and having from one to three double bonds are such materials as cyclooctene, 1,4- and 1,5-cyclooctadiene, 1,3,5-cyclooctatriene, cyclononene, 1,4- and 1,5-cyclononadiene, 1,4,7-cyclononatriene, cyclodecene, 1,4-, 1,5- and 1,6-cyclodecadiene, 1,4,6- and 1,4,7-cyclodecatriene, cycloundecene, 1,4-, 1,5-, and 1,6-cycloundecadiene, 1,4,7- and 1,4,8-cycloundecatriene, cyclododecene, 1,4-, 1,5-, 1,6- and 1,7-cyclododecadiene, 1,4,7-, 1,4,8-, 1,4,9- and 1,5,9-cyclododecatriene.

The following examples illustrate the use of the compositions of this invention in the polymerization of such unsaturated alicyclic compounds.

EXAMPLE 1

Commercial grade pentane, which had been purified by washing with sulphuric acid followed by a water wash and drying over silica gel, was used as a solvent. Cyclooctene which was freshly distilled over sodium was used as the monomer. The experiments were carried out in 4-ounce bottles which were dried at 120° C. for about 12 hours and cooled in a nitrogen atmosphere. Each bottle was charged with 25.5 grams (g) of cyclooctene and 70 milliliters (ml.) of pentane of which 10 ml. was vented by placing the bottles on a warm sand bath before each bottle was capped with a self-sealing gasket. The catalyst components were added in a manner that the oxygen-containing (C) component went in first followed by the tungsten component (B) followed by the organoaluminum component (A). The (A) component was aluminum triisobutyl (TIBA) and was added as a 0.1 molar solution in heptane, and was used in an amount of $3.5 \times 10^{-4}$ mols per 25.5 g. of cyclooctene. The (B) component was tungsten hexachloride ($WCl_6$) and was added as a 0.1 molar solution in toluene, and was used in amount of $4.5 \times 10^{-4}$ mols per 25.5 g. of cyclooctene. Component (C), the oxygen-containing compound, was added with the aid of a micrometer syringe. The particular oxygen-containing compounds employed and the amounts used are set forth in column 2 in the table below. The polymerizations were conducted at room temperature (about 25° C.) and terminated after 20 hours with 5 ml. of a benzene solution of tetraethylenepentamine (TEPA) (0.1 molar) containing 6 grams of ditertiary butyl-paracresol per 100 ml. of solution. The resulting polymers were coagulated with isopropanol, dried and weighed. The Al/W/O mol ratio is set forth in column 3 and the yield of solid polymer obtained is set forth in column 4 of the table below.

TABLE 1

| Exp. No. | Component C ($M \times 10^4$) | Al/W/O mol ratio | Yield (percent) |
|---|---|---|---|
| 1 | 0.00 | 0.8/1.0/0.0 | 22.9 |
| $H_2O$—Water | | | |
| 2 | 3.90 | 0.8/1.0/0.87 | 60.5 |
| 3 | 7.80 | 0.8/1.0/1.73 | 37.0 |
| 4 | 19.50 | 0.8/1.0/4.33 | 89.5 |
| 5 | 25.90 | 0.8/1.0/6.72 | 73.2 |
| 6 | 39.00 | 0.8/1.0/8.67 | 74.7 |
| 7 | 78.00 | 0.8/1.0/17.34 | 79.5 |
| 8 | 117.00 | 0.8/1.0/26.00 | 6.7 |
| $C_2H_5OH$—Ethyl Alcohol | | | |
| 9 | 0.34 | 0.8/1.0/0.08 | 97.5 |
| 10 | 0.86 | 0.8/1.0/0.19 | 97.2 |
| 11 | 1.03 | 0.8/1.0/0.22 | 96.4 |
| 12 | 1.72 | 0.8/1.0/0.38 | 89.5 |
| 13 | 3.44 | 0.8/1.0/0.77 | 82.0 |
| 14 | 4.50 | 0.8/1.0/1.0 | 89.7 |
| $CH_3OH$—Methyl Alcohol | | | |
| 15 | 1.50 | 0.8/1.0/0.33 | 65.5 |
| 16 | 2.50 | 0.8/1.0/0.56 | 70.0 |
| 17 | 5.0 | 0.8/1.0/1.11 | 73.5 |
| 18 | 7.5 | 0.8/1.0/1.67 | 70.0 |
| $C_6H_5OH$—Phenol | | | |
| 19 | 0.10 | 0.8/1.0/0.022 | 80.4 |
| 20 | 0.20 | 0.8/1.0/0.045 | 65.8 |
| 21 | 0.80 | 0.8/1.0/0.178 | 65.3 |
| 22 | 1.10 | 0.8/1.0/0.245 | 51.0 |
| 23 | 2.20 | 0.8/1.0/0.490 | 50.8 |
| $C_6H_5-\underset{\underset{CH_3}{\vert}}{\overset{\overset{CH_3}{\vert}}{C}}-OH$—Cumyl Alcohol | | | |
| 24 | 0.71 | 0.8/1.0/0.16 | 72.0 |
| 25 | 1.43 | 0.8/1.0/0.32 | 82.0 |
| 26 | 2.86 | 0.8/1.0/0.63 | 86.0 |
| 27 | 4.28 | 0.8/1.0/0.95 | 89.0 |
| $C_6H_5-\underset{\underset{CH_3}{\vert}}{\overset{\overset{CH_3}{\vert}}{C}}-OOH$—Cumyl Hydroperoxide | | | |
| 28 | 1.30 | 0.8/1.0/0.29 | 20.5 |
| 29 | 2.93 | 0.8/1.0/0.65 | 67.5 |
| $\underset{\underset{CH_2OH}{\vert}}{\overset{\overset{CH_2OH}{\vert}}{CH}}-OH$—Glycerol | | | |
| 30 | 0.33 | 2.0/1.0/0.33 | 28.1 |
| 31 | 0.33 | 3.5/1.0/0.33 | 69.6 |
| 32 | 0.67 | 3.0/1.0/0.66 | 75.8 |
| 33 | 1.00 | 2.5/1.0/1.0 | 96.0 |

EXAMPLE 2

To a benzene solution was added equal molar quantities of $WCl_6$ and $C_2H_5OH$. To a polymerization bottle which contained 70 ml. of dry pentane, 8.5 g. of cyclooctene, and 8.8 g. of 1,5-cyclooctadiene was added sufficient quantity of the [$WCl_6+C_2H_5OH$] complex in the benzene solution to give $1 \times 10^{-4}$ mols of $WCl_6$ and $C_2H_5OH$. This was followed by $2 \times 10^{-4}$ mols of ethylaluminum dichloride. This polymerization was allowed to react for 24 hours at room temperature. Termination and product isolation were accomplished as in Example 1. A yield of 99.1% of solid copolymer was obtained.

The examples set forth are intended to be representative of the utility of the compositions of this invention. These examples by no means are intended to be limiting of the utility of the compositions of this invention.

While certain representative embodiments and details have been shown for the purpose of illustrating the invention, it will be apparent to those skilled in this art that various changes and modifications may be made therein without departing from the spirit or scope of the invention.

What is claimed is:

1. A new composition of matter comprising (A) at least one organoaluminum compound selected from the group consisting of trialkyl aluminums; triaryl aluminums; dialkyl aluminum halides; alkyl aluminum dihalides; mixtures of dialkyl aluminum halides and alkyl aluminum dihalides; dialkyl aluminum hydrides; aryl aluminum hydrides; and aryl aluminum hydrides and dihydrides; (B) at least one tungsten hexahalide and (C) at least one compound of the general formula ROH wherein R is selected from the group consisting of (1) alkyl, (2) aryl, (3) alkaryl, (4) arylalkyl, (5) alkenyl, (6) alkoxy, (7) aryloxy, (8) alkaryloxy and (9) radicals of (1) through (5) wherein at least one hydrogen is substituted by at least one hydroxyl (OH) group in which the molar relationship of (A), (B) and (C) is a molar ratio of B/C of from about 0.3/1 to about 20/1 and the molar ratio of A/B is about 0.5/1 to about 15/1.

2. A composition according to claim 1 in which the tungsten hexahalide is tungsten hexachloride.

3. A composition according to claim 1 in which the compound of (C) is an alcohol.

4. A composition according to claim 1 in which the compound of (C) is a hydroperoxide.

5. A composition according to claim 1 in which the organo-metallic compound is the trialkylaluminum.

6. A composition according to claim 1 in which the organoaluminum compound is an alkylaluminum dihalide.

7. A composition according to claim 1 in which the molar relationship of (A), (B) and (C) is a molar ratio of B/C from about 0.5/1 to about 5/1 and the molar ratio of A/B is from about 0.5/1 to about 8/1.

8. A composition according to claim 7 in which the organ-metallic compound is ethylaluminum dihalide, the tungsten halide is tungsten hexachloride and the compound of (C) is ethyl alcohol.

References Cited

UNITED STATES PATENTS

| | | | |
|---|---|---|---|
| 2,762,791 | 9/1956 | Pease | 260—94.9 |
| 3,024,227 | 3/1962 | Dowlin | 260—94.9 |
| 3,168,588 | 2/1965 | White | 260—683.15 |
| 3,345,351 | 10/1967 | McCall. | |
| 3,184,416 | 5/1965 | Mottus | 252—429 |
| 3,236,824 | 2/1966 | Wilhjelm | 260—88.2 |
| 3,159,614 | 12/1964 | Bloyaert. | |
| 3,116,272 | 12/1963 | Stewart | 260—94.3 |
| 2,996,459 | 8/1961 | Anderson | 252—429 |
| 3,219,589 | 11/1965 | Burke | 252—429 |

OTHER REFERENCES

The Chem. of Organic Compounds, Conant & Blatt, Macmillan Co., New York, 1959, pp. 333–334.

DANIEL E. WYMAN, Primary Examiner

P. M. FRENCH, Assistant Examiner